Figure 1:
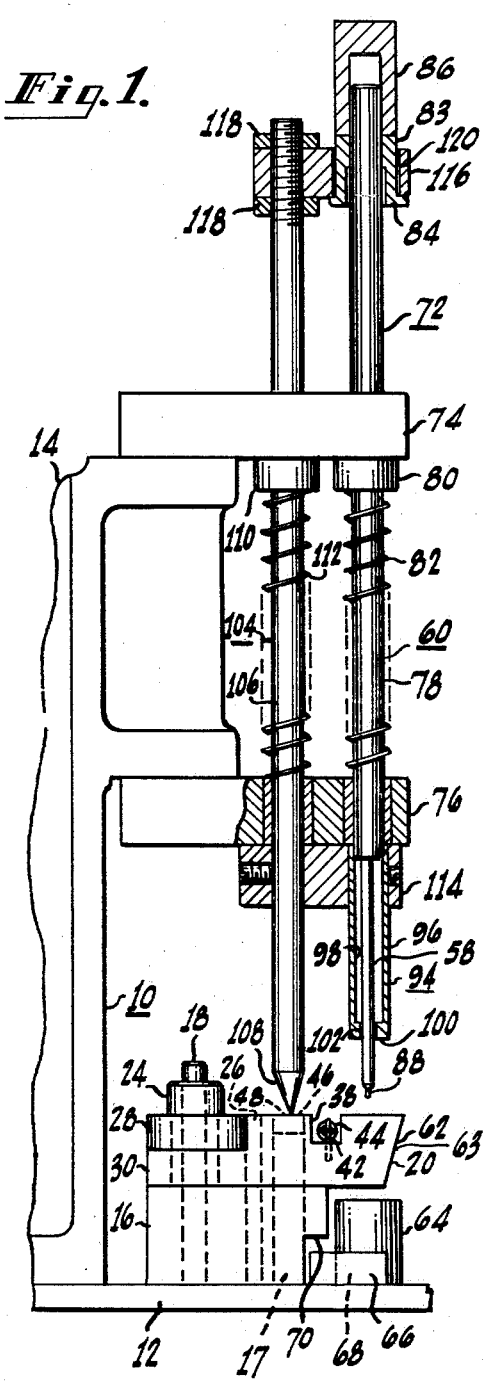

Nov. 19, 1963  A. FISCHER, JR  3,110,956
JIG LOADING APPARATUS
Filed Aug. 25, 1961  2 Sheets-Sheet 1

INVENTOR.
ADAM FISCHER JR.
BY
William A. Zalesak
ATTORNEY

Nov. 19, 1963  A. FISCHER, JR  3,110,956
JIG LOADING APPARATUS
Filed Aug. 25, 1961  2 Sheets-Sheet 2
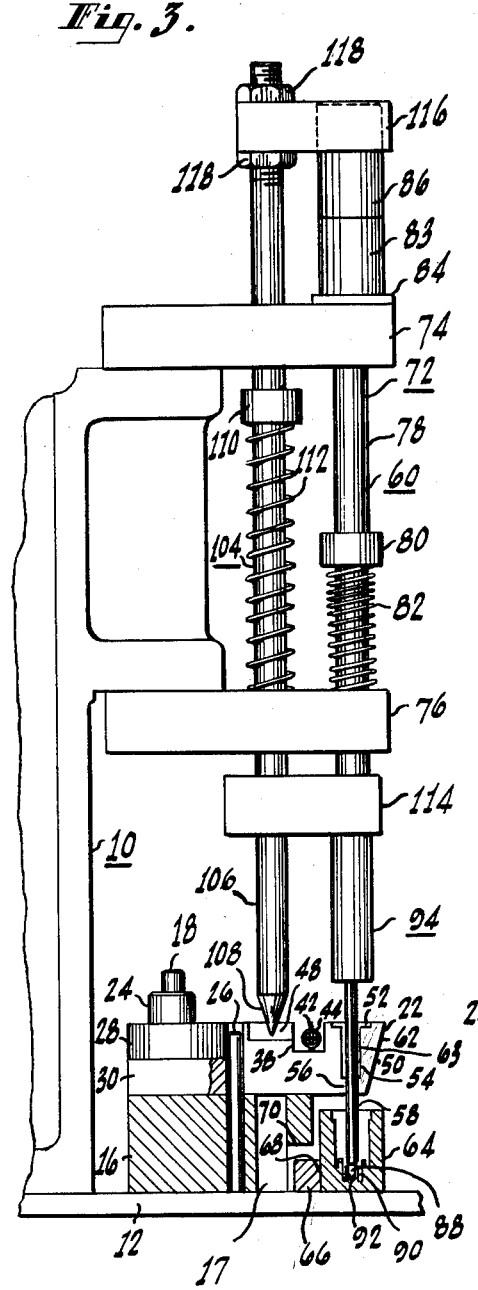
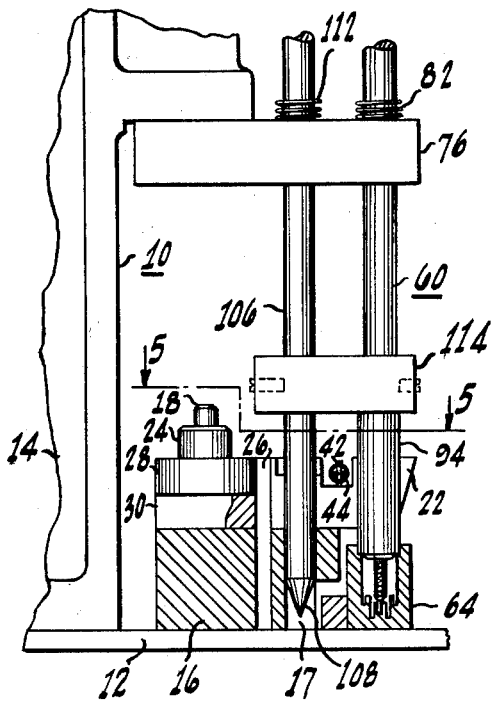
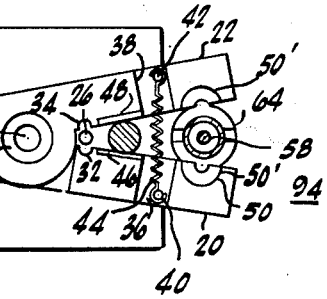
INVENTOR.
ADAM FISCHER JR.
BY
William A. Zahrak
ATTORNEY

United States Patent Office 3,110,956
Patented Nov. 19, 1963

3,110,956
JIG LOADING APPARATUS
Adam Fischer, Jr., Maplewood, N.J., assignor to Radio Corporation of America, a corporation of Delaware
Filed Aug. 25, 1961, Ser. No. 133,984
11 Claims. (Cl. 29—203)

This invention relates to a jig loading apparatus. More specifically, this invention relates to apparatus for loading a jig or the like.

In a certain type of electron tube, the tube electrodes are hollow cylinders which are concentrically arranged. Each of the electrodes is brazed to and supported by an individual annular flange. In the process of making these tubes, a tubular anode and its annular flange may be deposited in a brazing jig, in proper position. Then a tubular wound or open work grid and its flange are positioned in the jig concentrically with the tubular anode and its flange. A tubular cathode support sleeve and its flange are also put into the jig in a similar concentric relation. The header wafer, with the support and lead-in pins extending therethrough, is then placed in the brazing jig with the ends of support and lead-in pins contacting the individual flanges adjacent the peripheries of the flanges. The jig is put into a brazing furnace, and after brazing, the tube elements in the jig become a sturdy unitary assembly of tube elements and their flanges and their base wafer.

The tubular electrodes and electrode support range from less than 1/16 of an inch to about 1/8 of an inch in diameter and from about 3/16 of an inch to about 5/16 of an inch in length. Due to their small size, these elements are hard to handle manually. The brazing jig into which the tubular elements are to be loaded is commensurately small and the clearances between the electrodes when in the jig are very small. Furthermore, the tube electrodes are very fragile and easily distorted while being put into the tiny place provided therefor in the jig. Obviously, distorted tube elements in the jig will result in the production of a faulty electron tube. Therefore, loading of brazing jigs by hand is a difficult, tedious, time-consuming task requiring skilled operators. While mechanical aids for insertion of electrodes and their flanges into brazing jigs having been developed, they often require a large number of hand operations or expensive complicated machinery.

It is therefore an object of this invention to provide an improved apparatus for loading small parts into a brazing jig.

It is an object of this invention to provide an apparatus which will make it possible for an unskilled operator to load a tube element and its flange into a brazing jig expeditiously and without distortion of the elements.

It is a further object to provide a simple, relatively inexpensive apparatus for inserting a vacuum tube element and its supporting flange substantially simultaneously into a brazing jig.

Apparatus utilizing this invention includes a pair of pivoted members forming a pocket, the pocket having a centrally located hole through it. A longitudinally movable quill is positioned in registry with said pocket to be extended through a tube element and its flange in the pocket and through the hole when the quill is moved to jig loading position. An elongated plunger movable parallel to the quill is provided for opening the pocket members after the quill has passed through the pocket and hole and into a brazing jig or the like which may be supported on the base. A stripper may be mounted for movement along the quill and towards the jig to strip the elements off the quill and deposit them in the jig which is registered with the pocket and quill, and may be joined to the plunger to provide timely opening of the pocket members for action of the stripper.

Figure 2:
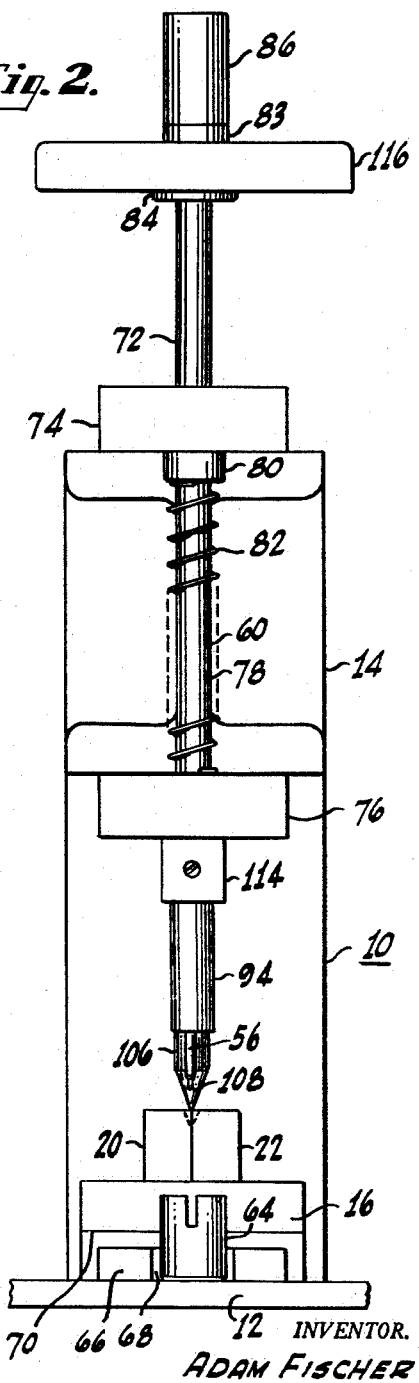

This invention is described in detail in the following description thereof taken with the accompanying drawings in which:

FIG. 1 is a side elevation partly in section of the apparatus using this invention;
FIG. 2 is a front elevation thereof;
FIG. 3 is a side elevation, partially in section and with a pocket member broken away, and showing an intermediate step in the operation of this apparatus;
FIG. 4 is a fragmentary side elevation partially in section of the apparatus shown in FIG. 3 at a further intermediate step in its operation, and
FIG. 5 is a section on line 5—5 of the apparatus of FIG. 4.

A support frame 10 (see FIGS. 1, 2 and 3 particularly) includes a base 12 having an upwardly extending bracket 14 fixed to one side thereof. An anvil 16 is fixed to the base 12 at one side of the bracket 14. A bore 17 extends through the anvil 16 near the right hand end thereof, as viewed in FIG. 3 for a purpose to be described. A pin 18 extends through the anvil vertically near the left-hand end thereof as viewed in FIG. 1. A locating pin 26 (see FIG. 3) extends from the top of the anvil 16 parallel to pin 18 and between pin 18 and bore 17. A pair of elongated pocket members 20 and 22 (see also FIG. 5) are pivotally mounted on pin 18, and a collar 24 holds the pocket members 20 and 22 in position thereon.

The pivoted pocket members 20 and 22 are shaped to pivot or rotate about pin 18 and to register when urged together. The pocket members 20 and 22 have rearly extending portions 30 and 28 respectively. The portion 28 is about half the thickness of the remainder of the pocket member 22 and is an extension of the top thereof. The other portion 30 comprises an extension of the bottom of the other pocket member 20. The rear portions 28 and 30 are each cut away (see FIG. 5) to provide clearance so that the two pocket members 20 and 22 can turn freely, within limits, on the same pin 18 and have the pocket members in registry when in closed position. The locating pin 26, which extends upwardly from anvil 16, extends into the recesses 32 and 34 (FIG. 5), of the two pocket members 20 and 22 respectively when the pocket members are closed. Grooves 36 and 38 are cut into the upper surface of the pocket members 20 and 22 to receive a tension spring 44, for holding the pocket members together. Pins 40 and 42 extend from each pocket member 20 and 22 into the grooves 36 and 38, and the tension spring 44 is connected between the pins 40 and 42. Thus the two pocket members 20 and 22 are urged into closed position or into contact with each other, their angular position with respect to the anvil 16 as they are closed being determined by the contact of the recesses 32 and 34 thereof against the rigid locating pin 26.

The pocket members 20 and 22 have beveled portions 46 and 48 extending from the upper surface thereof and intermediate their ends, together forming, when the pocket members are closed, a V-shaped groove, for a purpose to be described. A pocket 50 is formed in the free ends of the pocket members and extends through the pocket members 20 and 22, one half 50' of the pocket 50 being formed in each pocket member 20 and 22. The pocket 50 comprises three contiguous portions including an upper portion 52 (FIG. 3) which is of large diameter, shaped and sized to fit a flange. The central portion 54 of the pocket 50 is tubular and of smaller diameter, sized to fit a tubular electron tube element. The third portion 56 of the pocket 50 is also tubular, of still smaller diameter, and of smaller diameter than the tubular electron tube element which fits the middle portion 54. The portion 56 has a diameter large enough to permit portion 58 of a quill 60, to be described, to slide therethrough. The end portions 62 of the pocket members 20 and 22 are beveled at 63 to permit the operator to see into a jig 64.

A jig locating bar 66 is fixed to the base 12 to the right of the anvil 16 as viewed in FIGS. 1 and 3. This jig locating bar has a V-shaped notch 68 in the right edge as viewed in FIGS. 1 and 3 and visible also in FIG. 2, to receive and preliminarily locate the cylindrical jig 64. If necessary, the anvil 16 may be cut away as shown at 70, FIGS. 1, 2 and 3, to provide clearance for the jig locating bar 66.

The quill 60 and a stripper 94 and a pocket opener 104 are assembled in an assembly 72 mounted on an upstanding bracket 14 by means of brackets 74 and 76. The quill 60 which includes an upper large diameter portion 78 slidably mounted in brackets 74 and 76. A collar 80 is fixed to the quill 60 along its upper portion 78 and a compression spring 82 is positioned between the collar 80 and the upper surface of the lower bracket 76 to urge the quill 60 upwards and away from pocket members 20 and 22. A stop 83 is fastened, as by threading, to the upper portion 78 of the quill 60. The stop 83 has a shoulder 84 extending radially outwardly therefrom for a purpse to be described. A vertically extending pusher handle 86 is fixed as by threading on the top of the quill 60. Tightening threaded handle 86 and stop 83 together locks them in position on quill 60. The quill 60 further comprises the intermediate portion 58 of a diameter small enough to extend through the vacuum tube flange and the tube electrode in the pocket 50 and through the bottom portion 56 of the pocket 50. A lower portion 88 of the quill 60 is of smallest diameter and fits into a locating portion 90 (FIG. 3) of the jig 64. The tip 92 of the quill 60 is conical to assist in moving the jig laterally, if necessary, to finally locate the jig 64 as the locating portion 88 of the quill 60 enters the locating portion 90 of the jig 64.

The stripper 94 of the quill, stripper and pocket opening assembly 72 comprises a tubular member 96 having a bore 98 (FIG. 1) part way therethrough into which the large diameter portion 78 of the quill 60 may loosely fit. The bottom portion 100 of the stripper 94 has a hole 102 coaxial with bore 98 and of a size to loosely fit the intermediate portion 58 of the quill 60. Therefore, upon pushing down on pusher 86, quill 60 may be moved down with respect to stripper 94.

The pocket opener 104 of the assembly 72 comprises a plunger 106 having a tapered lower end 108. The plunger is slidably mounted in bushings in the brackets 74 and 76 on the upstanding bracket 14 and moves parallel to the quill 60. The pocket opener 104 extends through the brackets 74 and 76 and between quill 60 and the extended axis of the pin 18 about which the pocket members 20 and 22 pivot. A collar 110 is fixed to the plunger 106 at an intermediate point therealong and a compression spring 112 is mounted between the lower bracket 76 and the collar 110 urging the plunger 106 upward. The lower end 108 of the plunger 106 is of conical shape and the tip thereof is directly above the facing beveled portions 46 and 48 of the pocket members 20 and 22. Motion of the plunger downward entering the conical portion between the pocket members 20 and 22 forces them apart and causes them to pivot about their pivot 18 and opens the pocket 50.

The quill, stripper and pocket opener assembly 72 further comprises a tie bar 114 fixed to the plunger 106 and to the stripper 94 below the lower bracket 76 whereby the stripper 94 moves with the plunger 106. A cross bar 116 is adjustably fixed at the top end of the plunger 106 by nuts 118. The right end (FIG. 1) of the tie bar 116 has a bore 120 therethrough, the handle 86 and stop 83 being slidably fitted within the bore 120. The shoulder 84 of the stop 83 extends beyond the edges of the bore 120 in the cross bar 116. Quill portion 58 may be moved down through the pocket 50 and into the jig 64 independently of pocket opener 104, as will be more fully explained hereinafter.

Operation of the apparatus is as follows: At the beginning of the cycle, the operator loads a tubular electrode in the intermediate portion 54 of the pocket 50 and its flange, properly oriented, into the top portion 52 of the pocket 50. A jig 64 is placed on the base 12 and is moved into the notch 68 in the jig locator bar 66. The operator pushes down on the top of handle 86, and the quill 60 is moved downward compressing spring 82. The tip 92, the bottom portion 88 and the intermediate portion 58 of the quill 60 go through the flange and the electrode and through the lower part 56 of the pocket 50. The tip 92 enters the locating portion 90 of the jig 64, and if the jig is misaligned, moves the jig 64 so that the bottom portion 88 may enter the locating portion 90 of the jig 64. The shoulder 84 of stop 83 hits the top of bracket 74 and the motion of the quill in the downward direction is ended. The operator continues to hold handle 86 down and pushes down on cross member 116, moving the plunger 106 down and carrying the stripper 94 down with it. The conical end 108 of the plunger 106 enters the V-shaped space 46 and 48 between the pocket members 20 and 22, rotating them away from each other about their pivot 18 and opening the pocket 50. The plunger 106 continues downward entering the hole 17 in the anvil 16 provided therefor. The plunger 106 while keeping the pockets 50 open, also moves the stripper 94 into and through the open pocket 50 and into stripping position in the jig 64 as shown in FIG. 4. The operator releases the handle 86 but keeps the cross piece 116 down and the spring 82 moves the quill 60 up until the shoulder 84 contacts the lower side of the cross member 116. The quill is now out of the tubular electrode and out of its flange, the flange and electrode being stripped from the quill 60 by stripper 94. The operator now releases the cross member 116 and the stripper 94 (and quill 60) moves upward. After the stripper 94 is above the pocket members 20 and 22, the bottom end 108 of the plunger 106 no longer separates the pocket members 20 and 22 and the spring 44 moves the pocket members 20 and 22 to contacting position and closes the pocket 50. The operator now puts a tubular electrode and its flange into the pocket 50 and the cycle is completed. The cycle may then be repeated.

What is claimed is:

1. A jig loading apparatus comprising a pair of movable pocket members, spring means for urging said pocket members into contacting position, a pocket being formed by the contacting portions of said pocket members, said pocket having an upper element holding space, and a bottom hole, said pocket space and hole being aligned, a quill slidably mounted for movement through said pocket along the axis thereof and having a portion of a size to extend through said hole, a plunger having a tapered end, and means for moving said plunger for inserting said tapered end between said pocket members and to one side of said pocket to open said pocket, and a stripper surrounding said quill and fixed to said plunger.

2. A jig loading apparatus comprising a pair of pivotally mounted pocket members, spring means for urging said pocket members into contacting position, a pocket being formed by the contacting portions of said pocket members, said pocket having an upper element holding space, an intermediate element holding space and a bottom hole, said pocket spaces and hole being aligned, a quill slidably mounted for movement through said pocket along the axis thereof and having a portion of a size to extend through said hole, a plunger having a tapered end, and means for moving said plunger for inserting said tapered end between said pocket members and to one side of said pocket to open said pocket.

3. A jig loading apparatus comprising a pair of pivotally mounted pocket members, spring means for urging said pocket members into contacting position, a pocket being formed by the contacting portions of said pocket members, said pocket having an upper element holding space, an intermediate element holding space and a bottom hole, said pocket spaces and hole being aligned, a quill slidably mounted for movement through said pocket along the axis thereof and having a portion of a size to extend through said bottom hole, a stripper adjacent said quill portion and mounted for motion along said quill portion, a plunger having a tapered end, means for moving said plunger for inserting said tapered end between said pocket members and to one side of said pocket to open said pocket and means for moving said stripper along said quill.

4. Apparatus for loading a jig or the like comprising a pair of pivotally mounted members, spring means for urging said members pivotally into contacting position, said members defining between them when in said contacting position a pocket having an upper space, an intermediate space, and a lower space, said spaces being axially aligned, a quill mounted for axial movement through said spaces from the upper to the lower, a stripper mounted for axial motion along said quill, a plunger having a tapered end and movable in the axial direction for insertion of said end between said members to one side of said pocket to separate said members, said stripper being joined to said plunger for axial motion.

5. A jig loading apparatus comprising a pair of pocket members pivotally mounted on a support means, said pocket members each having a portion of a pocket in a face thereof, spring means for rotating said pocket members towards each other about said pivot to bring said faces into contact, said pocket having an upper portion of relatively large diameter, an intermediate portion of smaller diameter and a bottom portion comprising a cylindrical hole, said portions of said pocket being axially aligned, a slidably mounted quill having a lower portion of a size that slidably fits said hole, a stripper mounted for motion along said quill portion, a plunger extending parallel to said quill portion and having a tapered lower end, said quill being mounted to slide into and through said pocket along the axis thereof, said stripper being mounted on said plunger and surrounding said quill portion, means for moving said quill portion through said stripper and through said hole, means for thereafter causing said stripper to move along said quill portion in the direction of movement of said quill portion, and means for thereafter moving said quill portion in the opposite direction whereby said quill portion is withdrawn within said stripper and means for moving the tapered end of said plunger between said pocket members and adjacent said pocket to open said pocket.

6. A jig loading apparatus comprising a base, a jig loading bar having a notch therein fixed to said base, an anvil mounted on said base, a pin extending upwardly from said anvil, a pair of pocket members pivoted on said pin, one end of each of said pocket members overlying said jig locating bar, a spring stretched between said pocket members to cause contact of faces of said pocket members, there being one half of a pocket in each of said faces, the pocket comprising an upper bore portion of relatively large diameter, an intermediate bore portion of smaller diameter communicating with said relatively large portion, and a lower hole portion communicating with said intermediate portion, said portions being axially aligned, the upper portion of said faces being cut away at a region between said pocket and said pivot, a plunger having a tapered end mounted for sliding on said base in said direction parallel to said pin and overlying said cut away portion, a quill having a lower portion of lateral extent to extend axially through said hole mounted on said base parallel to said plunger and overlying the hole portion of said pocket, and a stripper surrounding said quill portion, said stripper being fixed to said plunger and movable therewith.

7. The invention as explained in claim 6 in which resilient means are provided for individually urging said quill and said plunger in a direction away from said pocket members.

8. A jig loading apparatus comprising a base, a pivot extending from said base, a pair of pocket members mounted on said pivot, resilient means to cause said pocket members to rotate towards each other about said pivot whereby a face of each thereof contacts a face of the other thereof, an axially symmetrical hole being formed in the contacting face portions with one half of the hole in each face portion, the axis of said hole being between said faces and parallel to said pivot, the pocket having three axially spaced intercommunicating portions, two of said portions being adapted to fit parts to be loaded in said jig and the third portion comprising a guide hole, a quill slidably mounted on said base and extending parallel to said pivot and having a portion that is movable into and through said guide hole, a plunger slidably mounted on said base and extending parallel to said pivot, said plunger being positioned between said quill and the axis of said pivot, the end of said plunger being over the contacting surface of said pocket members, and means to move said plunger so that the end thereof extends between said contacting faces to open said pocket.

9. A jig loading apparatus comprising a base, a pair of elongated pocket members pivotally mounted at one end on said base and spaced from said base, and biased toward each other, said pocket members including oppositely disposed registering recesses providing a pocket when said members are in contacting relationship, said pocket being formed to receive a tubular element and a flange-like element in coaxial relationship and having an axial hole through the bottom of said pocket, a quill slidably mounted on said base above said pocket and including an elongated element registering with said pocket and to be extended through said pocket for insertion into said tubular element and said flange-like element, an elongated element slidably mounted above said pocket members and movable parallel to said quill, said elongated element being formed and adapted to engage said pocket members to one side of said pocket for pivoting said pocket members to open position, said base having means for positioning a jig in registry with said pocket, and means associated with said quill assembly and said elongated element for first axially moving said quill through said pocket and through said hole to engage said jig and to thereafter move said elongated element to open said pocket members whereby said tubular element and said flange element may be deposited within said jig.

10. A jig loading apparatus comprising a base, a pair of pocket members pivotally mounted on said base and spaced from said base and biased toward each other, said pocket members including oppositely disposed registering recesses providing a pocket when said members are in contacting relationship, said pocket being shaped to receive a tubular element and a flange-like element and having an axial hole through the bottom of said pocket, said elements being coaxially aligned, a quill slidably supported on said base above said pocket and including an elongated element registering with said pocket to be extended through said pocket for insertion into said tubular element and said flange-like element, a stripper associated with said quill, a plunger slidably mounted on said base above said pocket members and movable parallel to said quill, said pocket members having plunger engaging recesses adjacent said pocket forming recesses, said plunger being formed and adapted to engage the walls of said recesses for pivoting said pocket members to open position, said base having means for positioning a jig in registry with said pocket, and means associated with said quill assembly and said plunger for first axially moving said quill through said pocket and through said hole to engage said jig and to thereafter move said plunger to open said pocket members whereby said tubular element and said flange may be stripped from said quill by said stripper to deposit said flange element and said tubular element within said jig.

11. A jig loading apparatus comprising a base, a pair of pocket members pivotally mounted on said base and spaced from said base, each of said pocket members including oppositely disposed registering recesses providing a pocket when in contacting relationship, said pocket being formed to receive a tubular element and a flange-like element and having an axial hole through the bottom of said pocket, a quill slidably mounted above said pocket and comprising an elongated element registering with said pocket and to be extended through said pocket for insertion into said tubular element and said flange-like element, and a stripper associated with said quill, a plunger slidably mounted above said pocket members and movable parallel to said quill, said pocket members having plunger engaging recesses adjacent said pocket forming recesses, said plunger being formed and adapted to engage said recesses for pivoting said pocket members to open said pocket members, said base having means for positioning a jig in registry with said pocket, and means associated with said quill assembly and said plunger for first moving said quill axially through said pocket to engage said jig and to thereafter move said plunger to open said pocket members whereby said tubular element and said flange may be stripped from said quill by said stripper to deposit said flange and said tubular element within said jig.

References Cited in the file of this patent
UNITED STATES PATENTS

| | | |
|---|---|---|
| 2,878,556 | Heidergott et al. | Mar. 24, 1959 |
| 2,906,011 | Focht | Sept. 29, 1959 |